(12) United States Patent
Ware et al.

(10) Patent No.: US 9,607,100 B1
(45) Date of Patent: Mar. 28, 2017

(54) PROVIDING INLINE SEARCH SUGGESTIONS FOR SEARCH STRINGS

(71) Applicant: Amazon Technologies, Inc., Reno, NV (US)

(72) Inventors: Erica Nichol Ware, Seattle, WA (US); Luis Antonio Diniz Fernandes de Morais Sarmento, Seattle, WA (US); Sarah Esther Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 321 days.

(21) Appl. No.: 14/303,187

(22) Filed: Jun. 12, 2014

(51) Int. Cl.
*G06F 17/30* (2006.01)

(52) U.S. Cl.
CPC .............................. *G06F 17/3097* (2013.01)

(58) Field of Classification Search
CPC ..................... G06F 17/3064; G06F 17/30672
See application file for complete search history.

(56) References Cited

U.S. PATENT DOCUMENTS

| | | | | |
|---|---|---|---|---|
| 8,275,786 B1* | 9/2012 | Dave | ................... | G06F 17/3064 707/766 |
| 9,245,029 B2* | 1/2016 | Musgrove | ......... | G06F 17/30672 |
| 2006/0143080 A1* | 6/2006 | Garg | ................... | G06F 17/3087 705/14.24 |
| 2009/0265251 A1* | 10/2009 | Dunlap | ................ | G06Q 10/087 705/26.1 |
| 2010/0146012 A1* | 6/2010 | Beaudreau | ........ | G06F 17/30648 707/803 |
| 2010/0281029 A1* | 11/2010 | Parikh | .................... | G06Q 30/02 707/741 |
| 2013/0339191 A1* | 12/2013 | Shanfeld | ............ | G06Q 30/0627 705/26.63 |
| 2015/0058172 A1* | 2/2015 | Nandyal | ........... | G06F 17/30277 705/26.63 |
| 2016/0042057 A1* | 2/2016 | McFarlane | ........ | G06F 17/30864 707/749 |

(Continued)

OTHER PUBLICATIONS

Heather Molina, ""People Also Ask": How to Optimize for Google's New Rich Answers", Linkedin, Aug. 10, 2015, pp. 1-4, www.linkedin.com/pulse/people-also-ask-how-optimize-googles-new-rich-answers-heather-molina.*

(Continued)

*Primary Examiner* — Cheryl Lewis
(74) *Attorney, Agent, or Firm* — Kilpatrick Townsend & Stockton LLP

(57) ABSTRACT

A method and system for providing inline search suggestions for a search string submitted by a user of an electronic marketplace is provided. A user submits a search string via a search interface in a computing device of the user. An electronic marketplace system receives the search string and identifies individual search terms in the search string that can be logically grouped together to form one or more segments in the search string. The electronic marketplace identifies a plurality of search strings submitted by a plurality of users that may relate to identified segments of search string submitted by the user. In one embodiment, the user selects a particular segment of the search string via the search interface. The electronic marketplace provides suggested search terms related to the identified segment to the user via the search interface.

21 Claims, 9 Drawing Sheets

(56) References Cited

U.S. PATENT DOCUMENTS

2016/0140237 A1* 5/2016 Musgrove ......... G06F 17/30672
707/706

OTHER PUBLICATIONS

Ann Smarty to Search Engine Optimization, "Google's "People Also Ask" (Related Questions): What Are They, and Why You Should Care", May 23, 2016, Internet Marketing Ninjas Blog, The latest SEO Industry news, notes, and chats, pp. 1-10.*

* cited by examiner

PROVIDING INLINE SEARCH SUGGESTIONS FOR SEARCH STRINGS

BACKGROUND

It has become common for merchants to utilize an electronic forum that provides users with the ability to view and/or purchase items using an electronic catalog of items. As an example, users may view information related to an item in an electronic catalog by submitting a search string for the item via a search engine. The search string may typically include search terms that describe the item that the user is looking for. Oftentimes, it is not easy for users to choose search terms that accurately represent their information needs. As a result, users may tend to narrow or broaden their searches during a search session in order to obtain more accurate search results.

BRIEF DESCRIPTION OF THE DRAWINGS

Various embodiments in accordance with the present disclosure will be described with reference to the drawings, in which.

DETAILED DESCRIPTION

Figure 1:
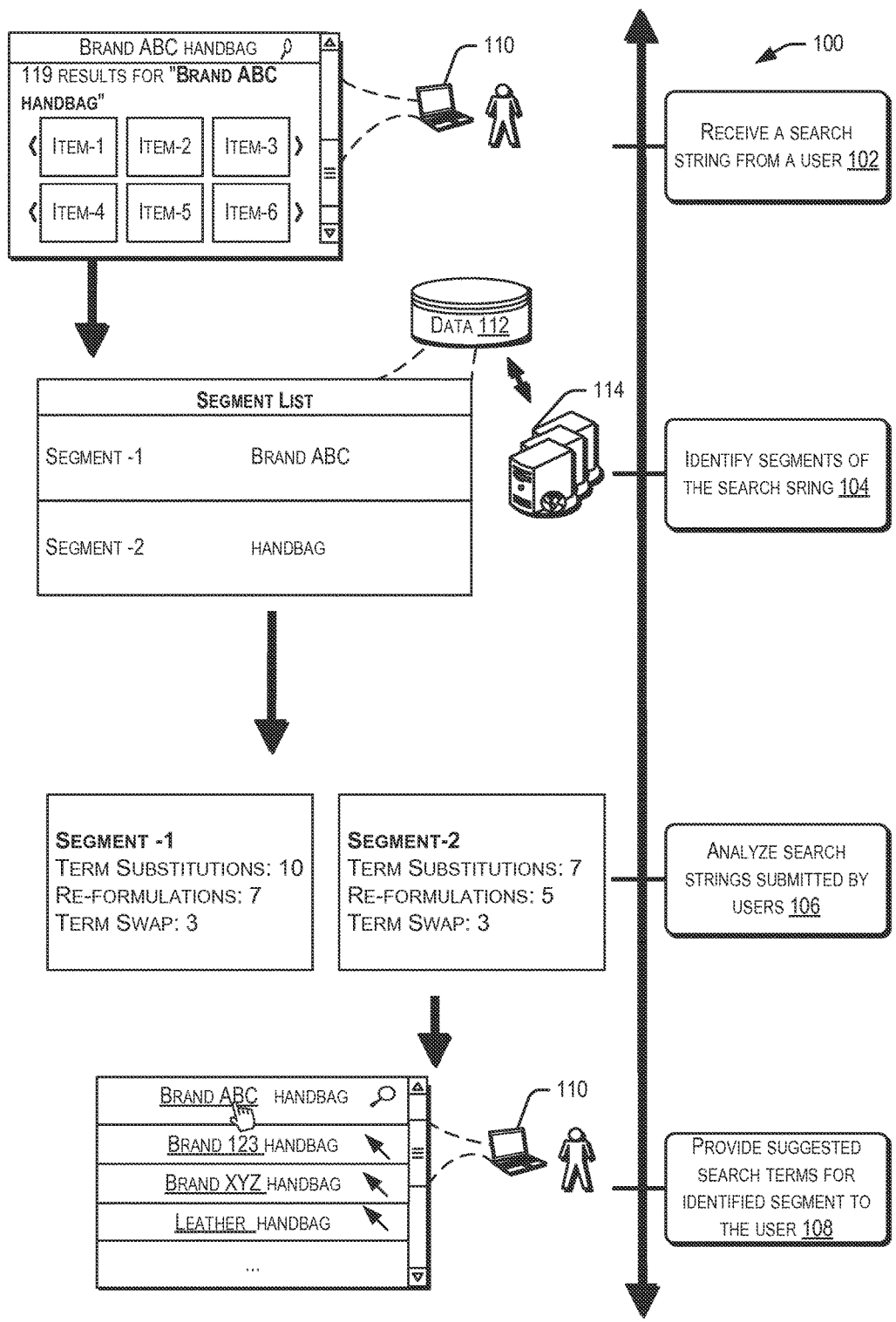
FIG. 1 illustrates an example flow for providing inline search suggestions for a search string submitted by a user, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein include a method and system for providing inline search suggestions for a search string submitted by a user. In one embodiment, a user may access a browser application on a user computing device to interact with an electronic marketplace website provided by an electronic marketplace system to search for, browse for, or place orders for items offered by the electronic marketplace. As described herein, an electronic marketplace may generally refer to a virtual market through which users may offer, order, buy, or sell items using an electronic catalog of items. As described herein, the term 'users' may refer to an individual, a set of individuals, or a programmatic object associated with a particular user account in the electronic marketplace. In accordance with at least one embodiment, a user may refer to a customer or a merchant of items listed in the marketplace.

In accordance with at least one embodiment, a user may submit a search string via a search query interface provided by the electronic marketplace website. In some examples, a search string may include a set of terms that make up a search phrase in the search string. A computing system which hosts the electronic marketplace may receive the initial search string submitted by the user and identify one or more segments of the search string. As described herein, segments of a search string may include individual search terms and/or search phrases in the search string that can be logically grouped together to form one or more segments in the search string.

In some examples, the computing system may identify an action performed by the user in relation to a search string submitted by the user. For example, an action may include a re-formulation of the initial search string submitted by the user. A re-formulation of the initial search string by the user may include, for example, a refinement or a scope change of the search string which may include a modification to one or more search terms in the search string. In some embodiments, the computing system may identify one or more segments of the search string based on the identified action and store the identified segments in a data store.

In accordance with at least one embodiment, the computing system may then analyze search strings submitted by a plurality of users of the electronic marketplace to identify search strings submitted by the users that may be possible variations and/or modifications of the identified segments of the search string submitted by the user. In one embodiment, the computing system may then determine a plurality of suggested search terms based at least in part on the analysis and provide the suggested search terms via the search query interface to the user.

In at least one non-limiting example, a user may utilize a computing device to search for an item, for example, 'Acme Brand Running shoes,' via an electronic marketplace website. In one example, a service provider (e.g., the electronic marketplace system) may identify that 'Acme Brand Running Shoes,' is a re-formulation of an initial search string, 'Running Shoes,' submitted by the user. In some examples, the service provider may then identify that the search terms, 'Acme Brand,' and 'Running Shoes,' correspond to individual segments in the search string, 'Acme Brand Running Shoes.' In one example, the service provider may then analyze search histories of a plurality of users of the electronic marketplace to identify search strings submitted by the users that may relate to the identified segments of the search string, 'Acme Brand Running Shoes.' The search strings may include, for example, search terms such as 'Beta Brand,' 'Men's Beta Brand,' 'Acme Brand Tennis Shoes,' 'Running Socks,' 'Kids Running Shoes,' 'Shoe Laces,' or the like. In one example, the service provider may then provide these search strings as suggested search terms for the identified segments to the user via the search query interface on the computing device of the user.

In accordance with at least one embodiment, the service provider may provide a visual indication of the identified segments of a search string submitted by the user. A visual indication may be provided by highlighting the identified segments in the search string. Other techniques for visually indicating segments in a search string may include, for example, color coding the identified segments, underlining the identified segments, and the like. In some embodiments, a user may select a particular segment by 'clicking,' 'tapping,' 'long pressing,' or 'hovering,' on the segment in the search query interface in the computing device of the user. In embodiments, the service provider may receive the selected segment from the user and render a plurality of suggested search terms related to the particular segment via the search query interface to the user.

In accordance with at least some embodiments, a user may select a suggested search term, 'Running Socks,' related to a particular segment, 'Running Shoes' in the search string submitted by the user. In one embodiment, the service provider may determine that 'Running Socks,' corresponds to a new segment in the search string submitted by the user and replace the segment 'Running Shoes,' with 'Running Socks,' in the search string submitted by the user. In accordance with at least one embodiment, the service provider may then store the newly identified segment in a data store.

In accordance with at least one embodiment, a user may 'click' in a region in the search query interface to insert a search term in between the identified segments, 'Acme Brand,' and 'Running Shoes,' in the search string submitted by the user. In other examples, the user may 'click' in a region in the search query interface to insert a term in the beginning of the search string or at the end of the search string. The service provider may then determine a plurality of search terms that may be inserted to the search string submitted by the user in between the identified segments, in the beginning of the search string or at the end of the search string such as 'Red,', 'Bright,' 'Size 10,' or the like and provide a plurality of suggestions to the user via the search query interface in the computing device of the user.

In accordance with at least one embodiment, the service provider may provide a set of search results related to a search string submitted by the user. In some examples, the user may select a search term in the search results or in a related searches section (e.g., a list of identified search terms that might be related to the submitted search string) by 'tapping' on, 'long pressing' on, or 'hovering' over the search term. As used herein, a 'tapping' gesture may be detected when the user touches an image or a search term in the search results, a 'long press' gesture may be detected when the user presses one or more fingers on a search term or an image for a minimum period of time and a 'hovering' gesture may be detected when the user's finger or the user's input device (e.g., a mouse) is near the screen. Additionally, sensing devices such as a camera, motion detector, a heat detection device and the like in the user's computing device may be configured to detect a hovering gesture from the user.

In some examples, the search term may include, for example, a related search, an alternative offer related to the item and the like. The service provider may then provide contextual inline search suggestions related to the selected search term to the user, via a user interface of the user computing device.

FIG. 1 illustrates an example flow of a process for providing inline search suggestions for a search string submitted by a user, according to at least one embodiment. In one embodiment, the operations performed by method 100 may be performed by an electronic marketplace system, such as by utilizing one or more service provider computers 114, described herein. In one example, the method 100 may include an operation to receive a search string submitted from a user at 102. As an example, the user may access a browser application on a user computing device 110 to interact with an electronic marketplace website provided by the service provider computers 114 to search for, browse for, or purchase items offered by the service provider computers 114.

In some examples, at 102, the method 100 may include an operation to identify an action performed by the user in relation to the search string. In some examples, the action may include a re-formulation of the initial search string submitted by the user. A re-formulation of the initial search string by the user may include, for example, a refinement or a scope change of the search string. A re-formulation of the search string may include, for example, a term addition or a term deletion of one or more search terms of the search string. As an example, a term addition may include the addition of one or more search terms to the search string. A term deletion may include the removal of one or more search terms to the search string. A re-formulation of a search string may include, for example, a substitution of a term in the search string with another term. As an example, at 102, the method 100 may include receiving a search string, 'Brand ABC handbag,' submitted by a user from the computing device 110 and identifying that the search string, 'Brand ABC handbag,' is a re-formulation of an initial query, 'handbag' submitted by the user.

In some examples, at 104, the method 100 may include one or more operations to identify one or more segments of the search string based on the identified action and storing the identified segments in a data store 112. In one embodiment, identifying segments of a search string may include identifying individual search terms in the search string that can be logically grouped together to form a segment in the search string. As an example, at 104, the method 100 may include identifying that the terms, 'Brand,' and 'ABC,' may logically be grouped together to form a segment, 'Brand ABC,' in the search string. In some embodiments, terms that may logically be grouped together to form a segment may be identified by identifying a relatedness of a group of search terms in the search string. For example, terms in a search string that correspond to brand-related information about an item (e.g., the name of a company which sells the item, product or service) may be grouped together to form a segment in the search string.

In some embodiments, segments of a search string may also be identified by analyzing user behavior such as, for example, search string submissions and/or web browsing activities of a plurality of users of the electronic marketplace. For example, search histories may be analyzed to identify search terms in search string submissions by the plurality of users that relate to a sequence of the user's search terms. For example, search terms in search string submissions may relate to a sequence of the user's search terms based on a category of an item (e.g., book titles, handbag brands, music titles, movie titles, and/or other types of items) in the search string. As an example, if a user types in search string such as 'Brand ABC handbag,' and the search query submissions by the plurality of users indicate that users searched for, 'Brand Beta handbag,' and it is determined that 'Brand ABC handbag,' and 'Brand Beta handbag,' belong to the same category of items (e.g., handbags), then, the terms, 'Brand ABC,' and 'handbags' may be identified as different segments in the search string submitted by the user. In some embodiments, segments in a search string may also be identified based on a frequency of occurrence of groups of terms in the search query histories, possible variations of the groups of terms in relation to the search terms in the search string issued by the user, item-detail-page viewing events by users, purchase histories indicative of particular items purchased and/or rented by users of the electronic marketplace, and the like.

Upon identifying segments of a search string as discussed above, in one embodiment, at 106, the method 100 may include one or more operations to analyze searches submitted by a plurality of users of the electronic marketplace to identify search strings submitted by the users that may be possible variations and/or modifications of the identified segments of the search string submitted by the user. For example, by analyzing search query histories, the method at 106 may include identifying that users of the electronic marketplace submitted searches for 'Men's Brand ABC,' 'Brand ABC', 'Brand 2 ABC,' 'Alpha Brand,' and the like. In one embodiment, the method at 106 may then include identifying that these modifications correspond to reformulations, term additions, term deletions, term substitutions, term swaps and the like of the search string submitted by the user. For example, the search string, 'Men's Brand ABC' may correspond to a re-formulation of the identified segment, 'Brand ABC' in the search string submitted by the user. Similarly, the search string, 'ABC' may correspond to a term deletion of a term in the identified segment, 'Brand ABC'. The search string 'Brand 2 ABC,' may correspond to a term substitution of the term, 'Brand' to 'Brand 2' in the identified segment, 'Brand ABC,', and the search string 'ABC Brand,' may correspond to a swap of the terms of the identified segment, 'Brand ABC,' in the search string.

In some examples, the method at 106 may also include one or more operations to determine the frequency of occurrence of the different types of modifications (e.g., re-formulations, term substitutions, term swaps, and the like) observed for each identified segment of the search string submitted by the user. In some examples, the method at 106 may include an operation to store this information in the data store 112.

In some examples, at 108, the method 100 may include determining a plurality of suggested search terms to the user based at least in part on the search terms identified for each segment of the search string discussed in relation to 106 above. In one example, at 108, the method 100 may include ranking the search terms identified for each segment in the order of frequency of occurrence of the different types of modifications (e.g., re-formulations, term substitutions, term swaps, and the like) observed for the segment. As an example, based on the analysis discussed in 106, if it is determined that the modifications made to the segment, 'Brand ABC' in the search string submitted by the user include 7 re-formulations of the segment, 10 term substitutions of the segment and 3 term swaps of the segment, then, in one embodiment, the method at 108 may include an operation to rank the search terms identified for the segment in the order of the frequency of occurrence of the different types of modifications, such as, 'Brand 2 ABC,' (term substitution), followed by 'Men's Brand ABC' (re-formulation) followed by 'Alpha Brand,' (term swap). In one embodiment, the method at 108 may include one or more operations to provide the ranked search terms as a plurality of suggested search terms for the identified segment, via the search query interface to the user.

Figure 2:
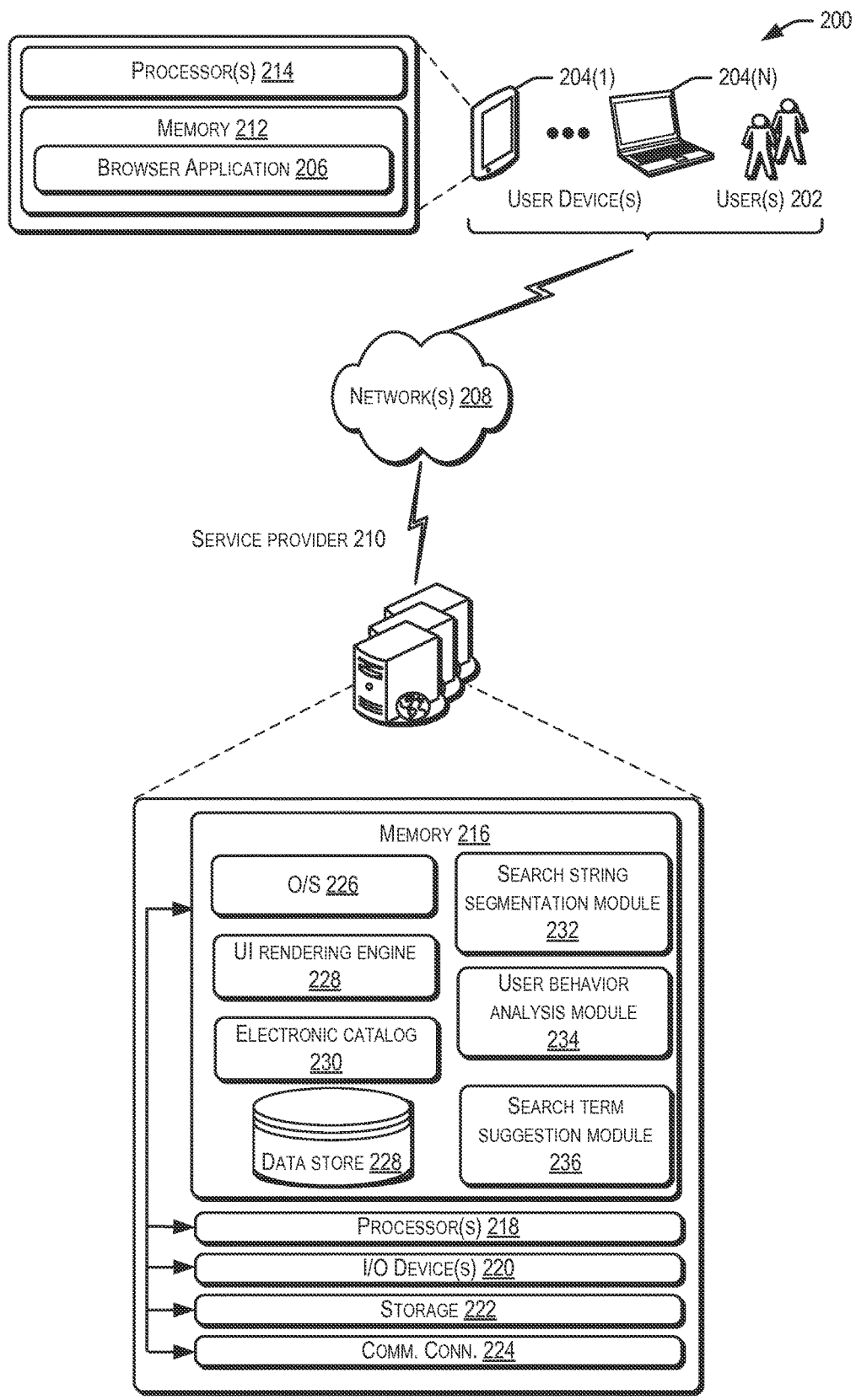
FIG. 2 illustrates an example architecture for providing inline search suggestions for a search string submitted by a user described herein that includes an electronic marketplace system and/or a user device connected via one or more networks, according to at least one example.

FIG. 2 illustrates an example architecture for providing inline search suggestions for a search string submitted by a user described herein that includes an electronic marketplace system and/or a user device connected via one or more networks, according to at least one example. In architecture 200, one or more users 202 (i.e., electronic marketplace consumers or web browser users) may utilize user computing devices 204(1)-(N) (collectively, user devices 204) to access a browser application 206 (e.g., a web browser) or a user interface accessible through the browser application 206 via one or more networks 208.

In some aspects, the browser application 206 may be configured to receive, store, and/or display a website (e.g., an electronic marketplace website), or other interface on a display screen of the user devices 204. The electronic marketplace website may be hosted, managed, and/or provided by an electronic marketplace system, such as by utilizing one or more service provider computers 210. In accordance with at least one embodiment, in addition to accessing the browser application 206 to view the electronic marketplace website, the users 202 may also utilize one or more native applications (e.g., a software application program) developed for use on a particular platform compatible with the user devices 204 to access the electronic marketplace website.

The one or more service provider computers 210 may, in some examples, provide computing resources such as, but not limited to, data storage, data access, management, virtualization, cloud-based software solutions, electronic content performance management, and the like. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 (e.g., via the electronic marketplace website), such as to search for, browse for or purchase items offered by the electronic marketplace, described herein. The one or more service provider computers 210, perhaps arranged in a cluster of servers or as a server farm, may host the electronic marketplace website and/or cloud-based software services. Other server architectures may also be used to host the electronic marketplace website and/or cloud-based software services. The browser application 206 may be capable of handling requests from many users 202 and serving, in response, various user interfaces that can be rendered at the user devices. In one example, the browser application 206 may be capable of receiving search strings from one or more users 204, and in response to the search strings, render network content (e.g., a web page) that includes hypertext information (e.g., information formatted in accordance with a hypertext markup language such as HTML) about an item listed (e.g., offered for sale) in the electronic marketplace system. The browser application 206 can also provide any type of website that supports user interaction, including search engine sites. The described techniques may similarly be implemented outside of the browser application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the service provider computers 210 via the networks 208, or via other network connections. Additionally, the user devices 204 may be part of the distributed system managed by, controlled by, or otherwise part of the service provider computers 210.

In one illustrative configuration, the user devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein, such as via the browser application 206 or dedicated applications (e.g., smart phone applications, tablet applications, etc.). The browser application 206 may be configured to receive, store, and/or display a website (e.g., the electronic marketplace website), or other interface for interacting with the service provider computers 210.

In accordance with at least one embodiment, the browser application 206 may receive search strings submitted by the users 202 and provide the search strings to the service provider computers 210. Additionally, the memory 212 may store access credentials and/or other user information such as, but not limited to, user IDs, passwords, and/or other user information.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user devices 204 and/or other service providers via the networks 208, or via other network connections.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 222 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 224 that allow the service provider computers 210 to communicate with a stored database, another computing device or server, user terminals and/or other devices on the networks 208. The service provider computers 210 may also include I/O device(s) 220, such as a keyboard, a mouse, a pen, a voice input device, a touch input device, a display, speakers, a printer, etc.

Turning to the contents of the memory 216 in more detail, the memory 216 may include an operating system 226, one or more data stores 228, and/or one or more application programs or services for implementing the features disclosed herein including a user interface (UI) rendering engine 228, an electronic catalog 230, search string segmentation module 232, a user behavior analysis module 234 and a search term suggestion module 236.

In accordance with at least one embodiment, the memory 216 may include a UI rendering engine 228. The UI rendering engine 228 may serve as the back-end component that may be configured to implement the various user interface elements that can be rendered on the user's browser application (e.g., 206) at the user devices. In accordance with at least one embodiment, the UI rendering engine 228 may be configured to implement one or more user interface elements to enable users on devices 204(1)-204(N) to interact with the electronic marketplace website while searching for, browsing, or purchasing items via the electronic marketplace 110. As an example, a user may utilize a user interface element to submit a search string into a search query interface via the web browser application (e.g., 206). The search string may be received by the communication connection(s) 224 in the electronic marketplace system and stored in the data store 228.

In accordance with at least one embodiment, the memory 216 may include a browsable electronic catalog 230 that is accessible over the network 208 to the users of user devices 204(1)-204(N), via the electronic marketplace website. The electronic catalog 230 may include a database of information about items that may be listed by users within the electronic marketplace system. The information may typically include item IDs, item descriptions and item images provided by manufacturers or distributors of the items. In some examples, information about items listed in the electronic marketplace system may be viewable by the users of user devices 204(1)-204(N) by browsing the electronic catalog 230 wherein each item may fully be identified within a corresponding item detail page.

In accordance with at least one embodiment, the memory 216 may include a search string segmentation module 232. In one embodiment, the search string segmentation module 232 may be configured to receive a search string submitted by a user of the electronic marketplace and identify an action performed by the user in relation to the search string. As an example, an action may include a re-formulation of the initial search string submitted by the user. For example, the user may re-formulate an initial search string by modifying one or more search terms in the search string to more accurately reflect information needs. In one embodiment, the search string segmentation module 232 may be configured to identify segments related to the search string based on the action and store the identified segments in the data store 228. As discussed in relation to FIG. 1, the search string segmentation module 232 may be configured to identify segments is various ways. As an example, the search string segmentation module 232 may be configured to identify segments of a search string by identifying individual search terms in the search string that can be logically grouped together to form a segment in the search string. Segments of a search string may also be identified by analyzing user behavior such as, for example, search string submissions and/or web browsing activities of a plurality of users of the electronic marketplace. For example, segments of a search string may be identified by identifying if a category of an item in search query submissions by a plurality of users corresponds to a category of an item in a search string submitted by the user. In some embodiments, and as discussed in relation to FIG. 1, segments in a search string may be identified based on a frequency of occurrence of groups of terms in search strings submitted by a plurality of users of the electronic marketplace that relate to the search terms in the search strings submitted by the user, possible variations of the group of terms in relation to the search terms in the search string issued by the user, item-detail-page viewing events, purchase histories indicative of particular items purchased and/or rented by users of the electronic marketplace, and the like.

In accordance with at least one embodiment, the memory 216 may include a user behavior analysis module 234. In one embodiment, the user behavior analysis module 234 may be configured to analyze search histories of a plurality of users of the electronic marketplace to identify search terms submitted by the plurality of users that may be related to one or more search terms in the identified segments of the search string issued by the user. As an example, a search term submitted by the plurality of users may include a re-formulation of an identified segment in the search string submitted by the user. A re-formulation may include, for example, a term addition or a term deletion of a term in the identified segment. In some examples, a search term submitted by the plurality of users may include a term substitution of a term in the segment, a term swap of a term in the segment, and the like. In some examples, the user behavior analysis module 234 may be configured to determine the frequency of occurrence of the different types of modifications (e.g., re-formulations, term substitutions, term swaps, and the like) observed for each identified segment of the search string and store this information in the data store 228.

In accordance with at least one embodiment, the memory 216 may include a search term suggestion module 236. In one embodiment, the search suggestion module 236 may be configured to determine a plurality of suggested search terms to the user based at least in part on the search terms identified for each segment of the search string, by the user behavior analysis module 234 as discussed above. In one embodiment, the search term suggestion module 236 may further be configured to rank the search terms identified for each segment in the order of frequency of occurrence of the different types of modifications (e.g., re-formulations, term substitutions, term swaps, and the like) observed for the segment. In some embodiments, the search term suggestion module 236 may further be configured to provide the ranked search terms as a plurality of suggested search terms for the identified segment, via the search query interface to the user.

In accordance with at least one embodiment, the UI rendering engine 228 may be configured to provide a visual indication of the identified segments of the search string submitted by a user in the search query interface. For example, the UI rendering engine 228 may be configured to provide a visual indication by highlighting the identified segments in the search string. Other techniques for visually indicating segments in a search string may include, for example, color coding the identified segments, underlining the identified segments, and the like in the search string. In some embodiments, the UI rendering engine 228 may be configured to receive a selection of a particular segment from the user. A selection of a particular segment may be received, for example, when the user 'clicks' on a segment identified in the search query interface, using one of the aforementioned input devices (e.g., 220). In one embodiment, the selected segment may be received by the communication connection(s) 224 in the electronic marketplace system 210 and provided to the user behavior analysis module 234. The user behavior analysis module 234 may be configured to provide a plurality of suggested search terms related to the identified segment to the UI rendering engine 228. The UI rendering engine 228 may be configured to render the plurality of suggested search terms to the user via the search query interface.

In accordance with at least some embodiments, the UI rendering engine 228 may be configured to receive a selection of a suggested search term related to an identified segment, from the user. In one embodiment, the selected suggested search term may be received by the communication connection(s) 224 in the electronic marketplace system 210 and provided to the search string segmentation module 232. In some embodiments, the search string segmentation module 232 may be configured to determine if the selected suggested search term corresponds to a new segment of the search string submitted by the user. The manner in which segments may be identified is discussed in detail in relation to FIG. 1. In some embodiments, the search string segmentation module 232 may then be configured to replace the identified segment with the new segment in the search string.

In accordance with at least some embodiments, the UI rendering engine 228 may be configured to receive an input from the user via the search query interface of the electronic marketplace website. As an example, an input may be received from the user when the user 'clicks' in a region of the search query interface to insert a search term into a search string. In one example, an input may be received from the user when the user 'clicks' in a region of the search query interface to insert a search term in between the identified segments of a search string. In other examples, an input may be received from the user when the user 'clicks' in a region of the search query interface to insert a search term in the beginning of the search string. In some examples, an input may be received from the user when the user 'clicks' in a region of the search query interface to insert a search term at the end of the search string. In one embodiment, the input may be received by the communication connection(s) 224 in the electronic marketplace system and provided to the user behavior analysis module 234. In one embodiment, the user behavior analysis module 234 may be configured to identify a plurality of search terms that may be inserted to the search string submitted by the user based on the input received from the user.

In one embodiment, the user behavior analysis module 234 may be configured to identify search terms in search query submissions by a plurality of users of the electronic marketplace that correspond to terms that may logically be inserted into the sequence of the identified segments of the user's search string based on the user's input. In some embodiments, the user behavior analysis module 234 may be configured to provide the search terms to the search term suggestion module 236. The search term suggestion module 236 may be configured to rank the search terms in the order of frequency of occurrence of the different types of modifications (e.g., re-formulations, term substitutions, term swaps, and the like) observed for the identified segments in the user's search string. In some embodiments, the UI rendering engine 228 may be configured to provide the ranked suggested search terms via the search query interface to the user. Additional operations performed by the UI rendering engine 228, the search string segmentation module 232, the user behavior analysis module 234 and the search term suggestion module 236 for enabling various interactions of a user with the identified segments of a search string and providing inline search suggestions related to a search string submitted by a user are discussed in detail in relation to FIGS. 3-6.

Figure 3:
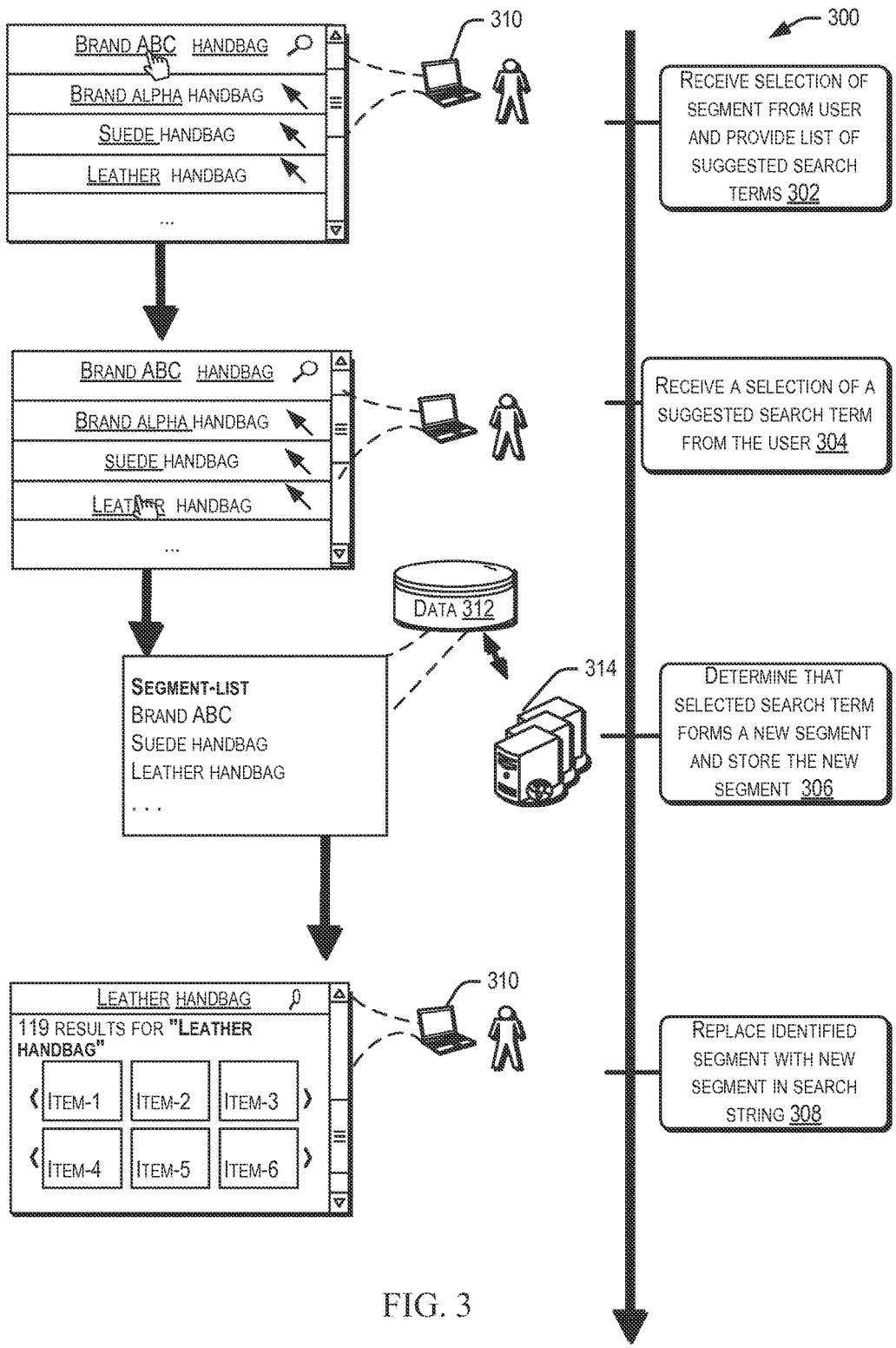
FIG. 3 is an illustrative flow depicting an interaction of a user with identified segments of a search string submitted by the user, according to at least one example.

FIG. 3 is an illustrative flow depicting an interaction of a user with identified segments of a search string submitted by the user, according to at least one example. In one embodiment, the operations of method 300 may be performed by one or more modules (e.g., UI rendering engine 228, the search string segmentation module 232, the user behavior analysis module 234 and the search term suggestion module 236) in the electronic marketplace system.

In one example, at 302, the method 300 may include an operation to receive a selection of a segment of a search string submitted by a user. For example, the user may access a browser application on a user computing device 310 to interact with an electronic marketplace website provided by a service provider computer 314 (e.g., electronic marketplace system) to search for, browse for, or purchase items offered by the electronic marketplace system. The user computing device 310 may be the same or similar to the user computing devices 110 and 204 discussed in relation to FIG. 1 and FIG. 2. Similarly, the service provider computer 314 may be the same or similar to the service provider computers 114 and 210 discussed in relation to FIG. 1 and FIG. 2. In the example illustrated in FIG. 3, the user may 'click' on the segment, 'Brand ABC' to select the segment. A plurality of search terms related to the selected segment, such as 'Brand Alpha,' 'Suede,' and 'Leather,' may be provided as a plurality of suggested search terms related to the identified segment to the user.

In some examples, at 304, the method 300 may include receiving a selection of a suggested search term from the user. In the example illustrated in FIG. 3, the user may select, for example, 'Leather handbag,' from the plurality of suggested search terms.

At 306, the method may include determining that the selected suggested search term 'Leather handbag,' forms a new segment of the search string submitted by the user. The manner in which segments may be identified is discussed in detail in relation to FIGS. 1 and 2. In some examples, the method at 306 may perform an operation to store the identified segment in a data store 312. The data store 312 may be the same or similar to the data store 112 and the data store 228 discussed in relation to FIG. 1 and FIG. 2.

In some examples, at 308, the method 300 may include replacing the identified segment, 'Brand ABC,' with the new segment 'Leather,' in the search string and providing a set of search results related to the search string, 'Leather handbag,' to the user.

Figure 4:
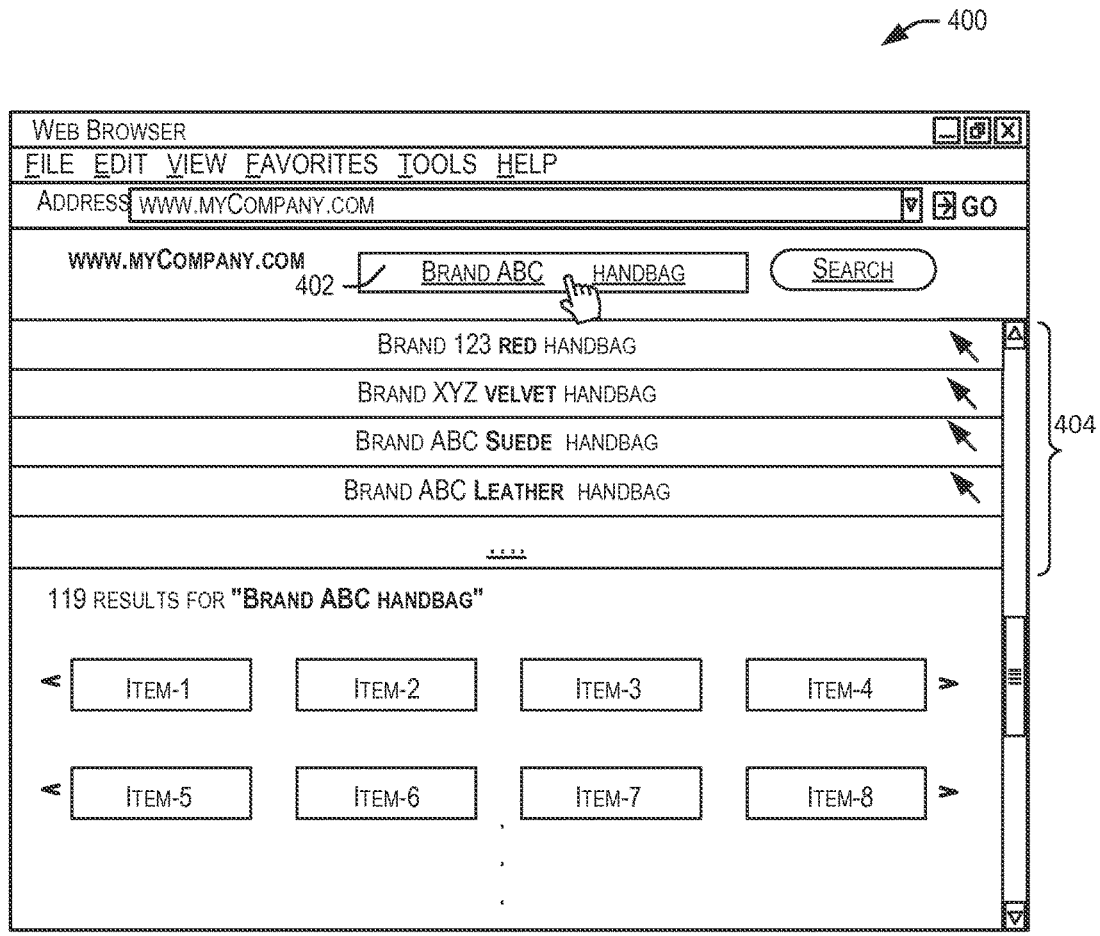
FIG. 4 is an exemplary illustration of an interaction of a user with identified segments of a search string submitted by the user, according to at least one example.

FIG. 4 is an exemplary illustration of an interaction of a user with identified segments of a search string submitted by the user, according to at least one example. In FIG. 4, the example environment 400 may be a graphical user interface viewable via a browser application (e.g., via the browser application 206) on the user's device. In the example illustrated in FIG. 4, a user submits a search string 'Brand ABC handbag' via a search query interface 402 provided by the electronic marketplace website. In one embodiment, the search terms 'Brand ABC,' and 'handbag,' may be identified as different segments in the search string. In one example, the user may 'click' in a region of the search query interface 402 to insert a search term in between the identified segments, 'Brand ABC,' and 'handbag.' Based on the input received from the user, in one embodiment, search terms that may be inserted into the search string in between the identified segments, 'Brand ABC,' and 'handbag' may be determined. The search terms may then be provided to the user as suggested search terms 404 via the search query interface 402 provided by the electronic marketplace website. In one embodiment, the plurality of suggested search terms related to the particular segment selected by the user may be visually highlighted in the search query interface to the user. In some examples, the user may select one of the suggested search terms 404. In one example, the suggested search term selected by the user may be provided in place of the search string to the user, via the search query interface 402. For example, the user may select a suggested search term, 'Brand XYZ velvet handbag,' from the list of suggested search terms 404. The search string, 'Brand ABC handbag,' may then be replaced with the suggested search term, 'Brand ABC velvet handbag,' in the search query interface 402. In some embodiments, segments may then be identified for the new search term, 'Brand ABC velvet handbag,' in a manner discussed in relation to FIG. 1 and FIG. 2 and the new segments may be stored in the data store.

Figure 5:
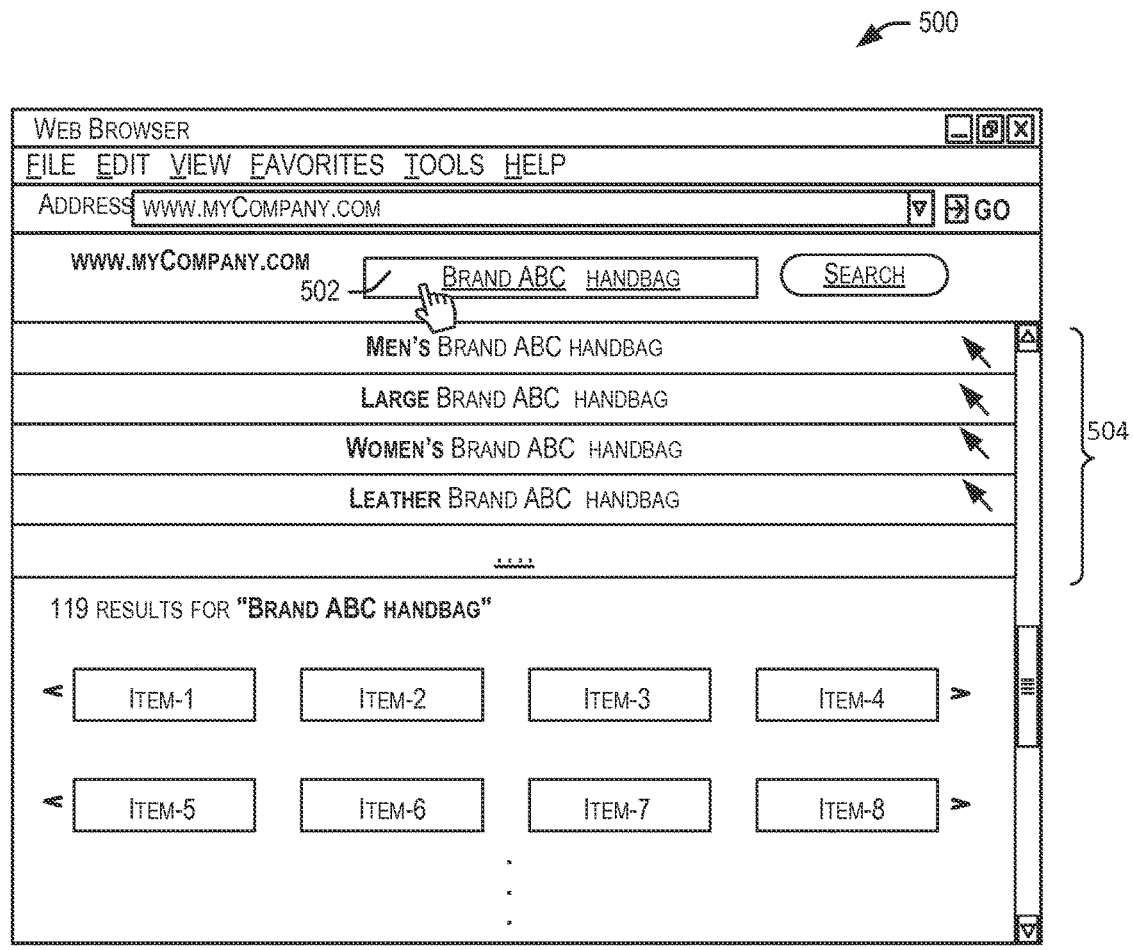
FIG. 5 is an exemplary illustration of an interaction of a user with identified segments of a search string submitted by the user, according to at least one example.

FIG. 5 is an exemplary illustration of an interaction of a user with identified segments of a search string submitted by the user, according to at least one example. In FIG. 5, the example environment 500 may be a graphical user interface viewable via a browser application (e.g., via the browser application 206) on the user's device. In the example illustrated in FIG. 5, a user submits a search string 'Brand ABC handbag' via a search query interface 502 provided by the electronic marketplace website. In one embodiment, the search terms 'Brand ABC,' and 'handbag' may be identified as different segments in the search string. In one example, the user may then 'click' in a region of the search query interface to insert a search term at the beginning of the search string. Based on the input received from the user, in one embodiment, search terms that may be inserted into the beginning of the search string may be identified. The search terms may then be provided to the user as suggested search terms 504 via the search query interface 502 provided by the electronic marketplace website.

Figure 6:
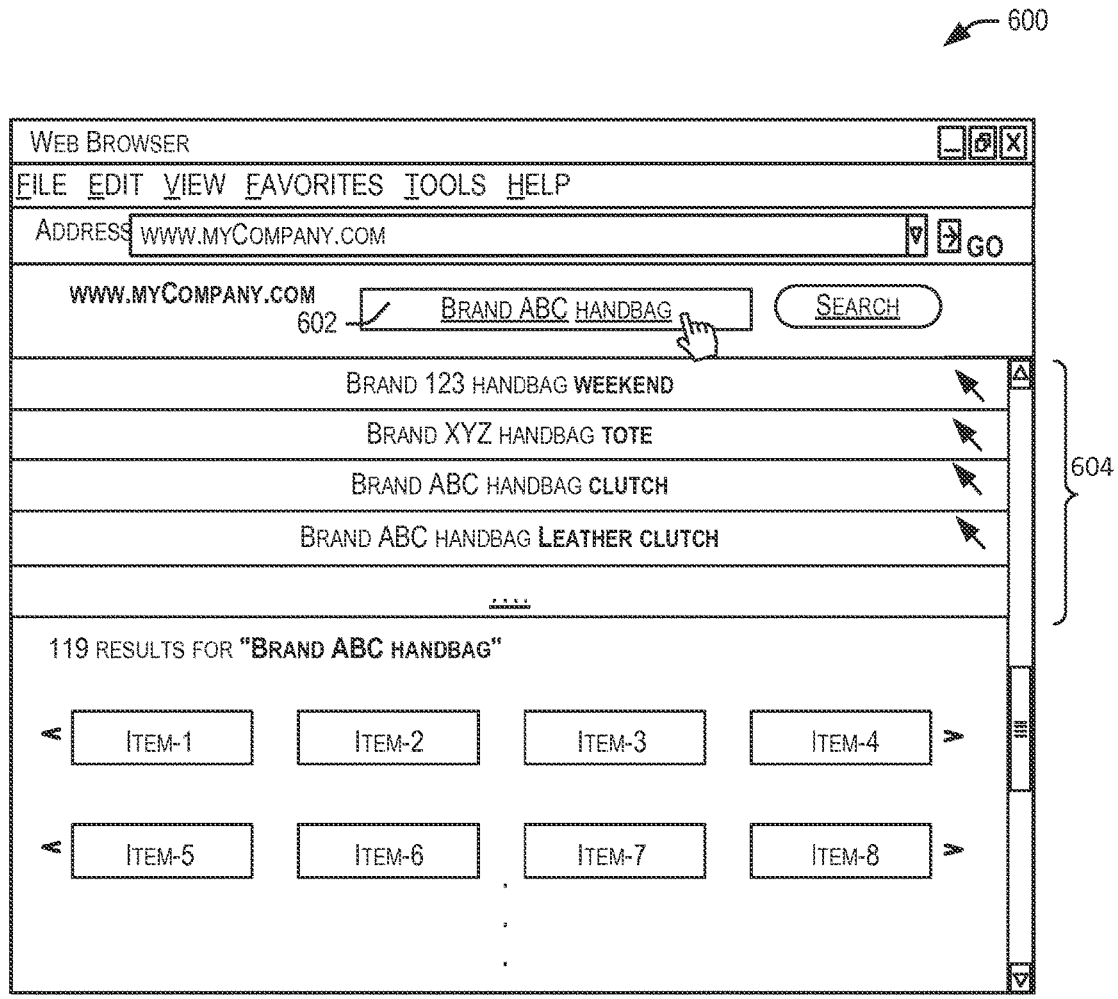
FIG. 6 is an exemplary illustration of an interaction of a user with identified segments of a search string submitted by the user, according to at least one example.

FIG. 6 is an exemplary illustration of an interaction of a user with identified segments of a search string submitted by the user, according to at least one example. In FIG. 6, the example environment 600 may be a graphical user interface viewable via a browser application (e.g., via the browser application 206) on the user's device. In the example illustrated in FIG. 6, a user submits a search string 'Brand ABC handbag' via a search query interface 602 provided by the electronic marketplace website. In one embodiment, the search terms 'Brand ABC,' and 'handbag' may be identified as different segments in the search string. In one example, the user may then 'click' in a region of the search query interface to insert a search term at the end of the search string. Based on the input received from the user, in one embodiment, search terms that may be inserted into the end of the search string may be identified. The search terms may then be provided to the user as suggested search terms 604 via the search query interface 602 provided by the electronic marketplace website.

Figure 7:
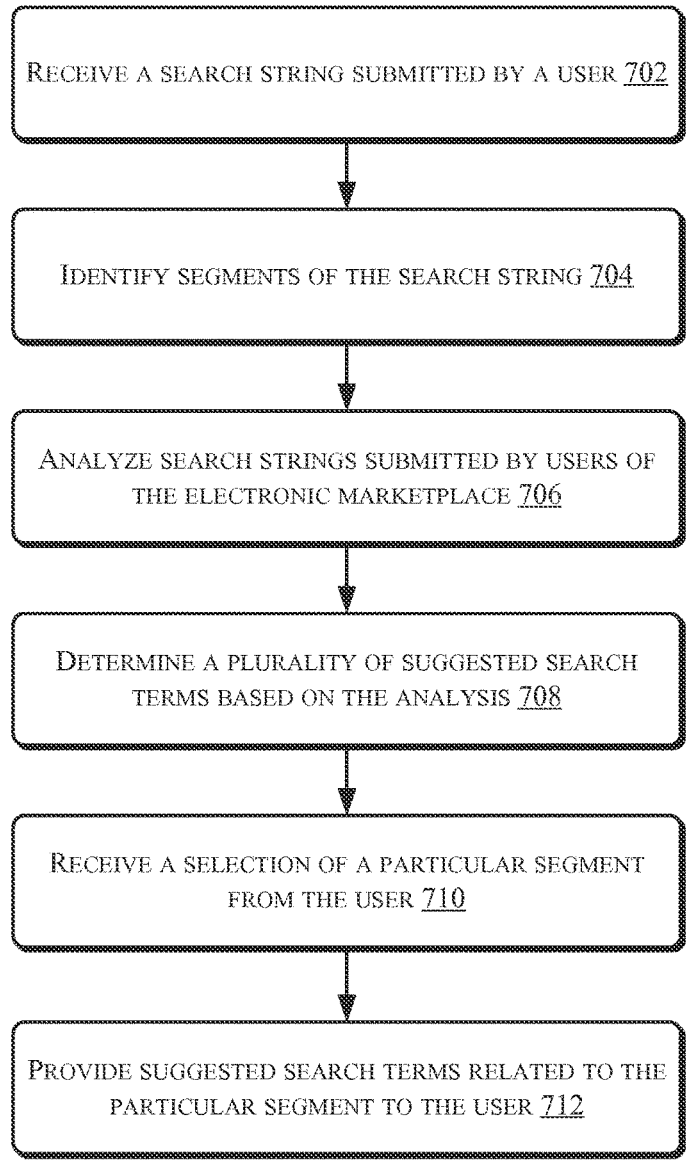
FIG. 7 illustrates a flow diagram of an example process 700 of providing inline search suggestions related to a search string submitted by a user of an electronic marketplace system, as described herein.
Figure 8:
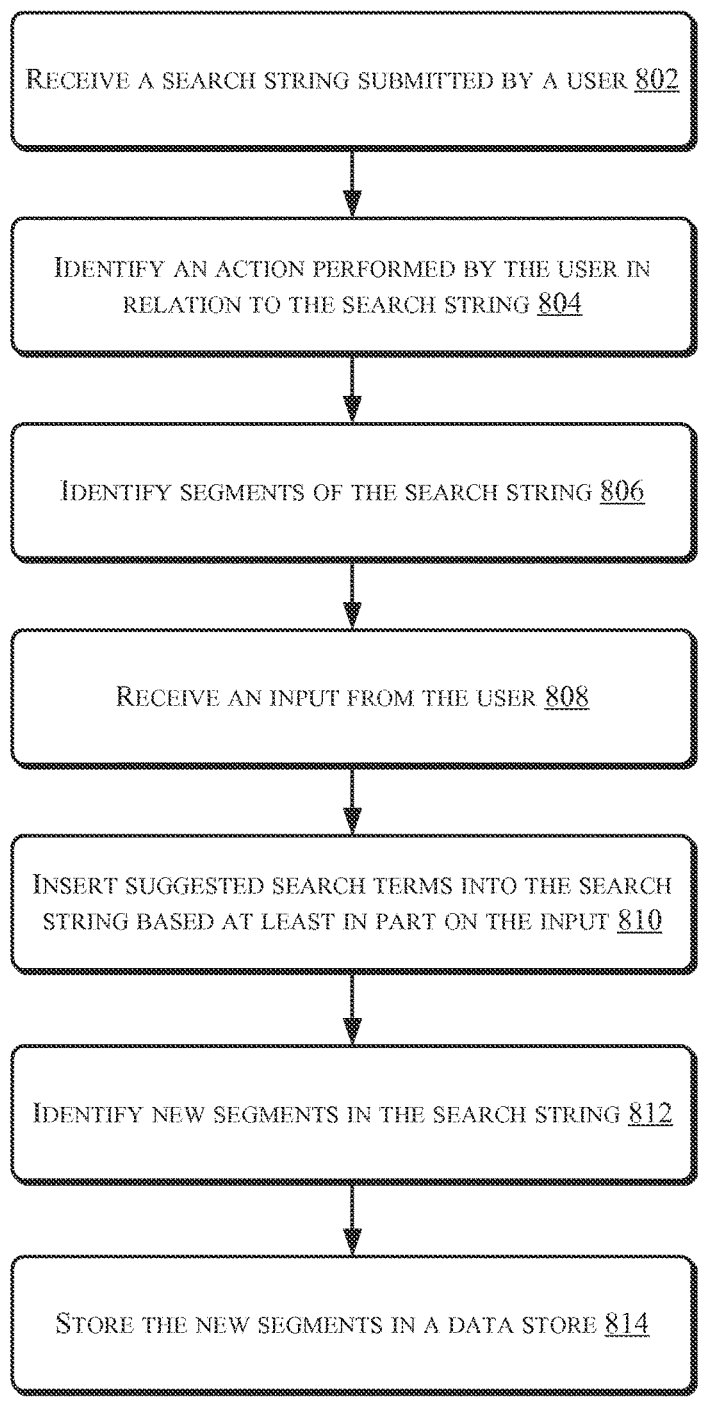
FIG. 8 illustrates a flow diagram of an example process 800 of providing inline search suggestions related to a search string submitted by a user of an electronic marketplace system, in accordance with another embodiment.

FIGS. 7-8 illustrate example flow diagrams showing respective processes 700 and 800 of providing inline search suggestions related to a search string submitted by a user of an electronic marketplace system, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the electronic marketplace (e.g., utilizing at least the UI rendering engine 228, the search string segmentation module 232, the user behavior analysis module 234 and the search term suggestion module 236) shown in at least FIG. 3 (and others) may perform the processes 700 and 800 of FIG. 7 and FIG. 8 respectively.

FIG. 7 illustrates a flow diagram of an example process 700 of providing inline search suggestions related to a search string submitted by a user of an electronic marketplace system, as described herein. The process at 700 may begin at 702 by receiving a search string from a user. At 704, the process at 700 may include identifying segments of the search string. The manner in which segments of a search string may be identified is discussed in detail in relation to FIG. 1 and FIG. 2. In some examples, at 706, the process 700 may include analyzing search strings submitted by a plurality of users of the electronic marketplace to identify search strings submitted by the users that may relate to the identified segments of the search string submitted by the user. As an example, the process at 706 may include identifying various modifications to the search string submitted by the user such as reformulations, term additions, term deletions, term substitutions, term swaps and the like of the search string. In some examples, at 708, the process 700 may include determining a plurality of suggested search terms based at least in part on the analysis. At 710, the process may include receiving a selection of a particular segment from the user. In some examples, at 712, the process 700 may include providing suggested search terms related to the particular segment via a search query interface to the user.

FIG. 8 illustrates a flow diagram of an example process 800 of providing inline search suggestions related to a search string submitted by a user of an electronic marketplace system, in accordance with another embodiment. The process at 800 may begin at 802 by receiving a search string from a user. At 804, the process 800 may include identifying an action performed by the user in relation to the search string 804. In one example, the action may include a re-formulation of the initial search string by the user. At 806, the process 800 may include identifying segments of the search string. In some examples, at 808, the process 800 may include receiving an input from the user. An input from the user may be received, for example, when the user selects an identified segment of the search string. In some examples, an input may be received from the user when the user wishes to insert a term in between identified segments of a search string, at the beginning of the search string, at the end of the search string, and so on. In other examples, an input may be received from the user when the user selects a suggested search term corresponding to an identified segment via the search query interface.

In some embodiments, at 810, the process 800 may include inserting suggested search terms into the search string submitted by the user, based at least in part on the input. At 812, the process 800 may include identifying new segments of the search string based on the inserted search term suggestions. In some examples, at 814, the process 800 may include storing the newly identified segments in a data store.

FIG. 900 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 9:
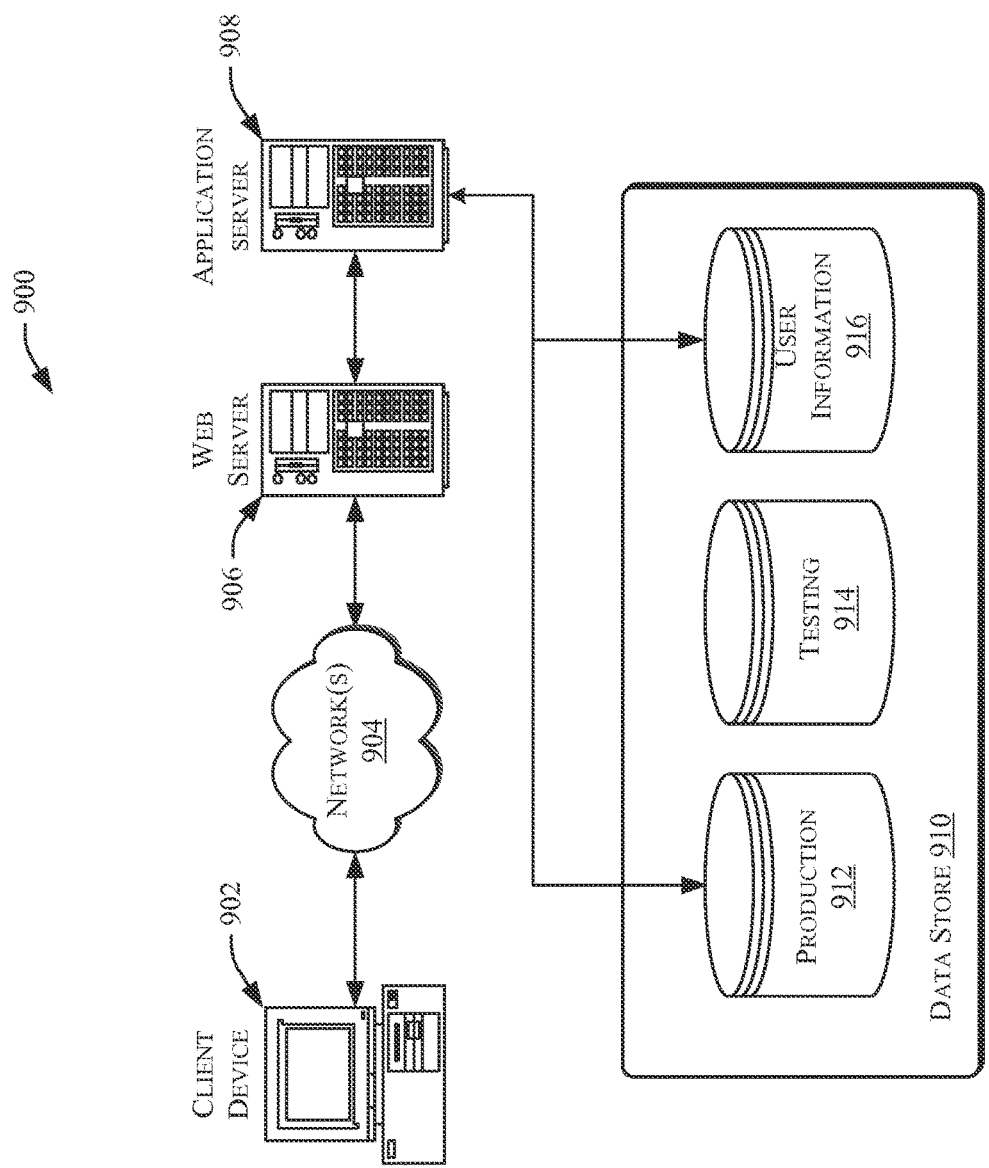
FIG. 9 illustrates an environment in which various embodiments can be implemented.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a search string submitted by a user of an electronic marketplace;
    identifying one or more segments of the search string, individual segments of the one or more segments comprising a portion of the search string;
    receiving an indication that the user has selected a location within the search string, the location being associated with at least one segment of the one or more segments;
    analyzing a plurality of search queries submitted by a plurality of users of the electronic marketplace;
    determining, by the computer system, a plurality of suggested search terms from the plurality of search queries, the plurality of suggested search terms corresponding to the location within the search string based at least in part on the analysis; and
    providing the plurality of suggested search terms corresponding to the location, the plurality of suggested search terms being presented utilizing a subset of the plurality of searches queries, the plurality of suggested search terms being provided via a search query interface in a computing device of the user.

2. The computer-implemented method of claim 1, further comprising:
    receiving a selection of a particular suggested term of the plurality of suggested search terms from the user; and
    reformulating the search string to include the suggested term at the selected location.

3. The computer-implemented method of claim 2, wherein the re-formulation of the search string comprises at least one of: a term addition to one or more search terms in the search string, a term deletion of one or more search terms in the search string or a term substitution of a term in the search string with another term.

4. The computer-implemented method of claim 1, further comprising providing a visual indication of the one or more segments of the search string in the search query interface in the computing device of the user.

5. The computer-implemented method of claim 1, further comprising receiving, from the user, a selection of a suggested search term related to the selected location from the plurality of suggested search terms.

6. The computer-implemented method of claim 5, further comprising providing the selected suggested search term as a new segment at the selected location of the search string.

7. One or more non-transitory computer-readable media collectively storing computer-executable instructions that, when executed by one or more computer systems, configure the one or more computer systems to collectively perform operations comprising:
    receiving a search string submitted by a user of an electronic marketplace;
    identifying one or more segments of the search string, individual segments of the one or more segments comprising a portion of the search string;
    receiving an input from the user via a search query interface in a computing device of the user, the input indicating selection of a region of the search string, the region being associated with at least one segment of the one or more segments;
    determining, based at least in part on the input, a plurality of suggested search terms from a plurality of search terms provided by other users of the electronic marketplace, the plurality of suggested search terms being related to the one or more segments of the search string; and
    providing the plurality of suggested search terms corresponding to the region, the plurality of suggested search terms being provided via the search query interface to the user.

8. The non-transitory computer-readable media of claim 7, wherein receiving the input from the user of the region of the search query interface causes a search term to be inserted in between the one or more segments of the search string.

9. The non-transitory computer-readable media of claim 7, wherein receiving the input from the user of the region of the search query interface causes a search term to be inserted in the beginning of the search string.

10. The non-transitory computer-readable media of claim 7, wherein receiving the input from the user of the region of the search query interface causes a search term to be inserted at the end of the search string.

11. The non-transitory computer-readable media of claim 7, further comprising receiving a selection of a suggested search term from the plurality of suggested search terms from the user based at least in part on the input from the user.

12. The non-transitory computer-readable media of claim 11, further comprising inserting the suggested search term into the search string based at least in part on the input and determining that the suggested search term forms a new segment in the search string.

13. The non-transitory computer-readable media of claim 12, further comprising storing the new segment in a data store.

14. The non-transitory computer-readable media of claim 7, wherein determining the plurality of suggested search terms related to the one or more segments of the search string is based at least in part on analyzing a plurality of search strings submitted by a plurality of users of the electronic marketplace.

15. A system comprising:
    memory configured to store computer-executable instructions; and
    at least one processor configured to access the memory and execute the computer-executable instructions to collectively at least:
        receive a search string submitted by a user of an electronic marketplace via a computing device;
        identify one or more segments of the search string, individual segments of the one or more segments comprising a portion of the search string;
        receive a selection of a particular location within the search string, the location being associated with at least one segment of the one or more segments;
        provide a plurality of suggested search terms related to the location to the user, the plurality of suggested search terms being based at least in part on the location and a plurality of search queries of other users of the electronic marketplace;
        receive a selection of a suggested search term from the plurality of suggested search terms from the user;
        determine that the suggested search term selected by the user forms a new segment of the search string submitted by the user; and
        provide the new segment via a search query interface in the computing device of the user.

16. The system of claim 15, wherein the at least one processor is configured to execute the computer-executable instructions to store the new segment in a data store.

17. The system of claim 16, wherein the at least one processor is configured to execute the computer-executable instructions to identify the one or more segments of the search string based at least in part on a category of an item in the search string.

18. The system of claim 16, wherein the at least one processor is configured to execute the computer-executable instructions to identify the one or more segments of the search string based at least in part on identifying a frequency of occurrence of a group of terms in search strings submitted by a plurality of users of the electronic marketplace that relate to search terms in the search strings submitted by the user.

19. The system of claim 16, wherein the at least one processor is configured to execute the computer-executable instructions to provide the plurality of suggested search terms related to the location based at least in part on analyzing search histories of a plurality of users of the electronic marketplace.

20. The system of claim 16, wherein the at least one processor is configured to execute the computer-executable instructions to visually highlight the one or more segments in the search string.

21. The system of claim 16, wherein the at least one processor is configured to execute the computer-executable instructions to visually highlight the plurality of suggested search terms related to the location selected by the user.

* * * * *